United States Patent
Davin

(10) Patent No.: US 8,857,027 B2
(45) Date of Patent: Oct. 14, 2014

(54) METHOD OF SEGMENTING IRRADIATED BOILING WATER REACTOR CONTROL ROD BLADES

(75) Inventor: Peter F. Davin, Jefferson Hills, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 524 days.

(21) Appl. No.: 13/612,905

(22) Filed: Sep. 13, 2012

(65) Prior Publication Data
US 2013/0074302 A1 Mar. 28, 2013

Related U.S. Application Data

(60) Provisional application No. 61/537,702, filed on Sep. 22, 2011.

(51) Int. Cl.
| | | |
|---|---|---|
| B23P 11/00 | (2006.01) | |
| G21C 19/32 | (2006.01) | |
| G21D 1/00 | (2006.01) | |
| G21F 9/36 | (2006.01) | |
| G21C 19/20 | (2006.01) | |
| G21C 7/113 | (2006.01) | |

(52) U.S. Cl.
CPC ............ *G21C 19/32* (2013.01); *G21Y 2004/60* (2013.01); *G21Y 2004/305* (2013.01); *G21Y 2004/601* (2013.01); *G21Y 2002/402* (2013.01); *G21C 19/207* (2013.01); *G21C 7/113* (2013.01); *G21D 1/003* (2013.01); *G21F 9/36* (2013.01); *Y02E 30/40* (2013.01)
USPC ....... 29/403.3; 29/426.1; 29/426.4; 29/426.5; 29/515; 29/723; 376/260; 403/279; 403/282; 403/285

(58) Field of Classification Search
CPC .................. G21Y 2002/402; G21Y 2004/601; G21Y 2004/305; G21Y 2004/60; G21C 19/207; B23P 19/025
USPC ........... 29/403.2, 403.3, 426.1, 426.2, 426.3, 29/426.4, 426.5, 515, 723; 376/260; 403/278, 279, 282, 283, 285
See application file for complete search history.

(56) References Cited

U.S. PATENT DOCUMENTS

| | | |
|---|---|---|
| 4,295,401 A | 10/1981 | Mullett |
| 4,507,840 A | 4/1985 | Steinert et al. |
| 4,643,845 A | 2/1987 | Omote et al. |
| 4,747,995 A | 5/1988 | Bednarik et al. |
| 5,055,236 A | 10/1991 | Krieg |
| 2005/0220254 A1 | 10/2005 | Hummel et al. |

FOREIGN PATENT DOCUMENTS

DE 40 17 987 A1 12/1991

OTHER PUBLICATIONS

International Preliminary Report on Patentability for PCT/US2012/055056 dated Mar. 25, 2014 (Forms PCT/IB/373, PCT/ISA/237).

*Primary Examiner* — Jermie Cozart
(74) *Attorney, Agent, or Firm* — Richard J. Coldren; Westinghouse Electric Company LLC

(57) ABSTRACT

A method of reducing the volume of a blade section of a boiling water reactor control rod for transport or storage that cuts the control rod spline into four substantially equal longitudinal sections, with each longitudinal section including one control rod blade. Each longitudinal section is radiologically characterized and the locations of desired lateral segmentation are identified. A band of malleable metal is wrapped around each longitudinal section at each of the locations and the bands are sheared to separate segments of the longitudinal section and the ends of the bands are crimped at the point of shearing to seal the interior of the segments.

10 Claims, 2 Drawing Sheets

METHOD OF SEGMENTING IRRADIATED BOILING WATER REACTOR CONTROL ROD BLADES

CROSS REFERENCE TO RELATED APPLICATION

This application claims priority to Provisional Application Ser. No. 61/537,702, entitled "Method of Segmenting Irradiated Boiling Water Reactor Control Rod Blades," filed Sep. 22, 2011 and is related to U.S. patent application Ser. No. 13/612,982, entitled "Apparatus For Vertically Segmenting A Boiling Water Reactor Control Rod Blade," filed concurrently herewith.

BACKGROUND

1. Field

This invention relates generally to the storage, transportation and/or disposal of highly radioactive components, and more particularly, to a method of reducing the volume of radioactive boiling water reactor control rods for long term storage.

2. Related Art

One type of commonly used boiling water nuclear reactor employs a nuclear fuel assembly comprised of fuel rods surrounded by a fuel channel. Each fuel channel of a boiling water reactor fuel assembly typically consists of a hollow, linear, elongated, four-sided channel of integral construction, which, except for its rounded corner edges, has a substantially square cross section. Commonly, each channel is roughly 14 feet (4.27 m) long by five inches (12.7 cm) square and laterally encloses a plurality of elongated fuel elements. The fuel elements are arranged to allow for the insertion of a cruciform-shaped control rod, which, during reactor operation, is movable vertically to control the nuclear reaction. As is generally known, the control rods include an upper portion having a handle and four upper ball rollers for guiding the control rod as it moves vertically and a lower portion comprising a lower casting and lower ball rollers. The main body structure includes four blades or panels which extend radially from a central spline. Preferably, the blades extend longitudinally to a height that substantially equals the height of the fuel elements, which is approximately 12 feet (3.66 m). The width of the control rods at the blade section is approximately twice the width of the panels, which is in the order of 10 inches (25.4 cms.) and the blades are approximately 2.8 in. (7 mm.) thick.

Following functional service, boiling water reactor control rod blades are difficult to store and dispose of because of their size, configuration, embrittled condition, and radiological activity. Heretofore within the United States, in-pool storage of control rod blades has been extremely space inefficient and dry cask storage is not readily available.

Control rod blades and other irradiated hardware are typically Class C, low level radioactive waste as defined and determined pursuant to 10 CFR 61 and related regulatory guidance, e.g., NRC's *Branch Technical Position on Concentration Averaging and Encapsulation*. Since Jul. 1, 2008, low level radioactive waste generators within the United States that are located outside of the Atlantic Compact (Connecticut, New Jersey and South Carolina) have not had access to Class B or Class C, low level radioactive waste disposal capacity. Lack of disposal capacity has caused boiling water reactor operators considerable spent fuel pool overcrowding. Though currently very uncertain and subject to numerous regulatory and commercial challenges, Class B and Class C low level radioactive waste disposal capacity for the remainder of the United States low level radioactive waste generators is anticipated in the relatively near future.

One technique for reducing the volume of boiling water reactor control rods for spent fuel pool storage has been to sever the upper and lower portions of the control rods from the control rods' blades. In the remaining main blade structure, the individual blade sections have been removed from the central spline by longitudinal cuts and the severed parts are then stacked for storage or burial as described in U.S. Pat. No. 4,507,840. An alternate approach has been taken in U.S. Pat. No. 5,055,236, which suggests that the vertical cut be made along the center line of the spline to divide the control rod blades into two chevrons. The chevrons can then be closely stacked for storage. Each of the approaches yields twelve-foot (3.66 m) long segments that are costly to shield and transport. U.S. Pat. No. 4,507,840 recognizes that since the blades enclose neutron absorber rods which contain radioactive gas, the vertical cuts must be made quite near the central spline to avoid releasing the radioactive gases. Thus, horizontal segmentation of the blades, which would cut across the sealed rods that contain the neutron absorber material and the radioactive gases, is problematic.

Therefore, for safe shipment, a new method is desired for reducing the storage volume of a boiling water reactor control rod.

Furthermore, such a method is desired that will reduce the length and width of the segments to be transported so that they will fit in existing, standard, licensed transport casks.

Additionally, such a method is desired that will minimize the release of radioactive debris.

SUMMARY

These and other objects are achieved by a method of reducing the storage volume of a boiling water reactor control rod having a main control element with four panels radially extending along an elongated length of a central spline at four 90° locations around a circumference of the spline, in a cruciform shape. The method includes a step of separating the spline along its elongated length into four substantially equal longitudinal sections with each longitudinal section including one of the panels. The method then identifies at least one elevation along a longitudinal length of each longitudinal section along which the longitudinal section is to be separated into lateral sections. Then a sleeve is wrapped laterally around the longitudinal section at the identified elevation, with the sleeve extending an incremental distance on either side of the elevation. The method then laterally shears at least one of the longitudinal sections at the elevation and substantially simultaneously seals the sleeve against an opposite side of the sleeve as it is sheared. Preferably, the sleeve extends substantially between one and four inches (2.54 and 10.16 cm) on either side of the elevation and more preferably between two and three inches (5.08 and 7.62 cm). Desirably, the sleeve thickness is approximately one-eighth of an inch (0.32 cm) and the sleeve is made out of a malleable metal such as stainless steel or copper.

In one embodiment, the step of separating the central spline is achieved by making two cuts along the elongated length and 90° apart around the circumference of the spline with the two cuts preferably being made substantially at the same time. Desirably, the sealing step is achieved by crimping a sheared end of the sleeve to the opposite side of the sleeve. In one preferred embodiment, the crimping step and the shearing step occur substantially simultaneously.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
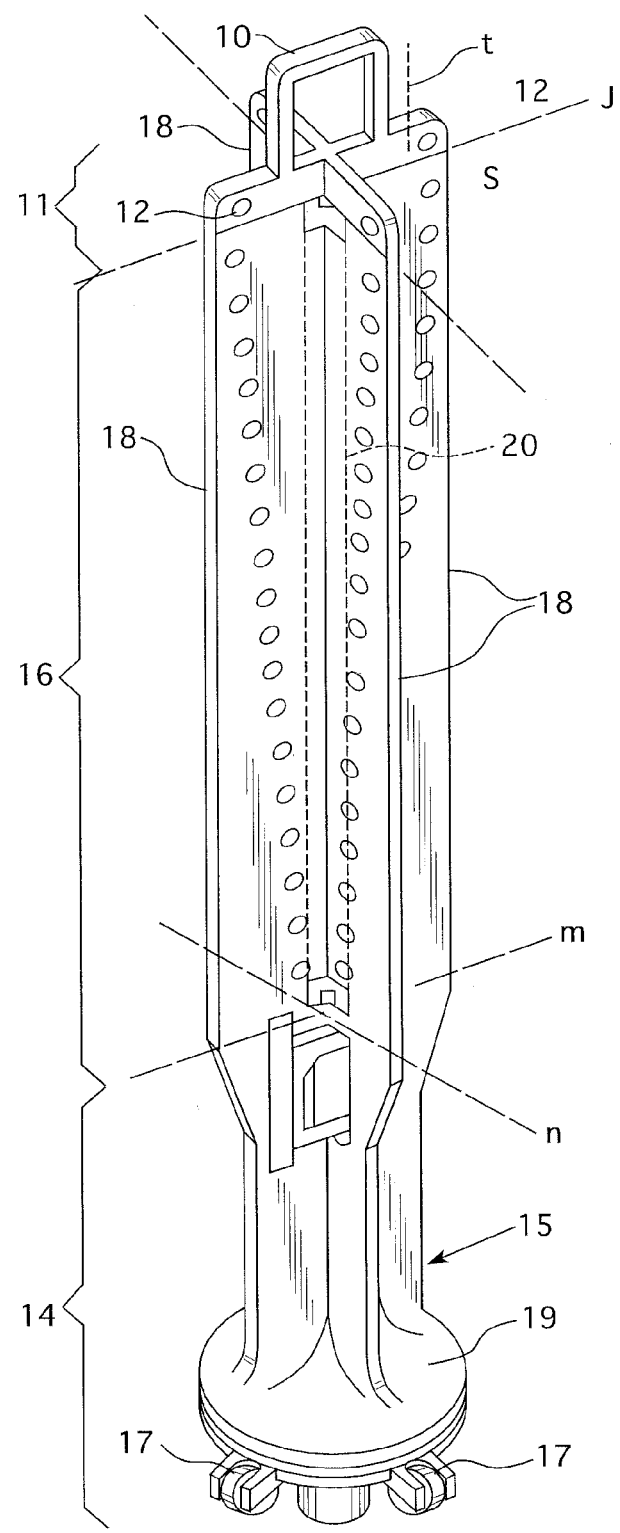
FIG. 1 is a perspective view of a boiling water reactor control rod.

FIG. 1 shows a boiling water reactor control rod blade of the type to which the present invention is applicable. As such, the control rod blade comprises an upper portion 11 having an upper handle 10 and four upper ball rollers 12; a lower portion 14 having a lower casting 15 and lower rollers 17; and a main blade structure 16 therebetween. The main blade structure 16 includes four panels or blades 18 arranged in a cruciform shape about a central spline 20. According to one embodiment of the invention, lower portion 14 is removed by cutting approximately in the plane defined by lines m and n, and the upper portion 11 is removed by cutting in a transverse plane defined by lines j and k. Another alternative is to just cut around the rollers to remove them or to leave the handle 10 in place. Although it is possible to practice the invention without removing even the rollers, it is desirable to do so since they typically contain cobalt and are radioactively much hotter than the other portions of the control rod blade.

For the general purposes of this description, the principal components of a control rod blade are the lifting handle 10, the stellite roller bearings 12 and 17, the lower portion 14 containing the velocity limiter 19 and the cruciform shape main body 16 including the blades or panels 18 and the central spline 20. To consolidate the control rod blade section 16 the upper portion 11 and the lower portion 14 are first removed in a manner consistent with existing art as part of a control rod blade volume reduction process.

The cruciform shaped main body 16 is comprised of four sheathed metallic "panels" 18 of metallic tubes containing powdered boron carbide or other neutron absorbing material that are welded together and to the central spline 20 lengthwise at opposing angles to form the cruciform shape. Because of the radioactive nature of the control rod, it is necessary for the volume reduction process to be performed under water, most preferably in the spent fuel pool. To separate the control rod into practically transportable segments it will be necessary to laterally segment the main body portion 16. However, under water lateral segmentation of the panels 16 will rupture both the sheathing and the tubes contained within the sheathing of the panels 16 thereby exposing the spent fuel pool to unwanted debris in the form of sheathing material, tubes and boron carbide. Embrittlement of the control rod blades caused by the extended neutron exposure that they will have experienced within the reactor compounds the difficulty of lateral segmentation.

One prior art method employed to reduce the volume of the control rod blades for storage includes the mechanical longitudinal segmentation of the control rod blade cruciform shaped main body 16 through the center spline 13 resulting in two chevron-shaped sections as is described in U.S. Pat. No. 5,055,236. Segmentation in this fashion substantially improves the in-pool storage efficiency, but does not lend the chevrons to a practical form for transportation to a remote site for storage or for lateral segmentation. One aspect of the method described herein is to further longitudinally segment each chevron along the remaining portion of the spline 13 thereby resulting in four separate and detached panels 18. This subsequent segmentation will improve in-pool storage efficiency, and substantially facilitate the lateral panel segmentation process that will facilitate containerization and optimal radiological characterization for purposes of shipment and disposal.

Figure 2:
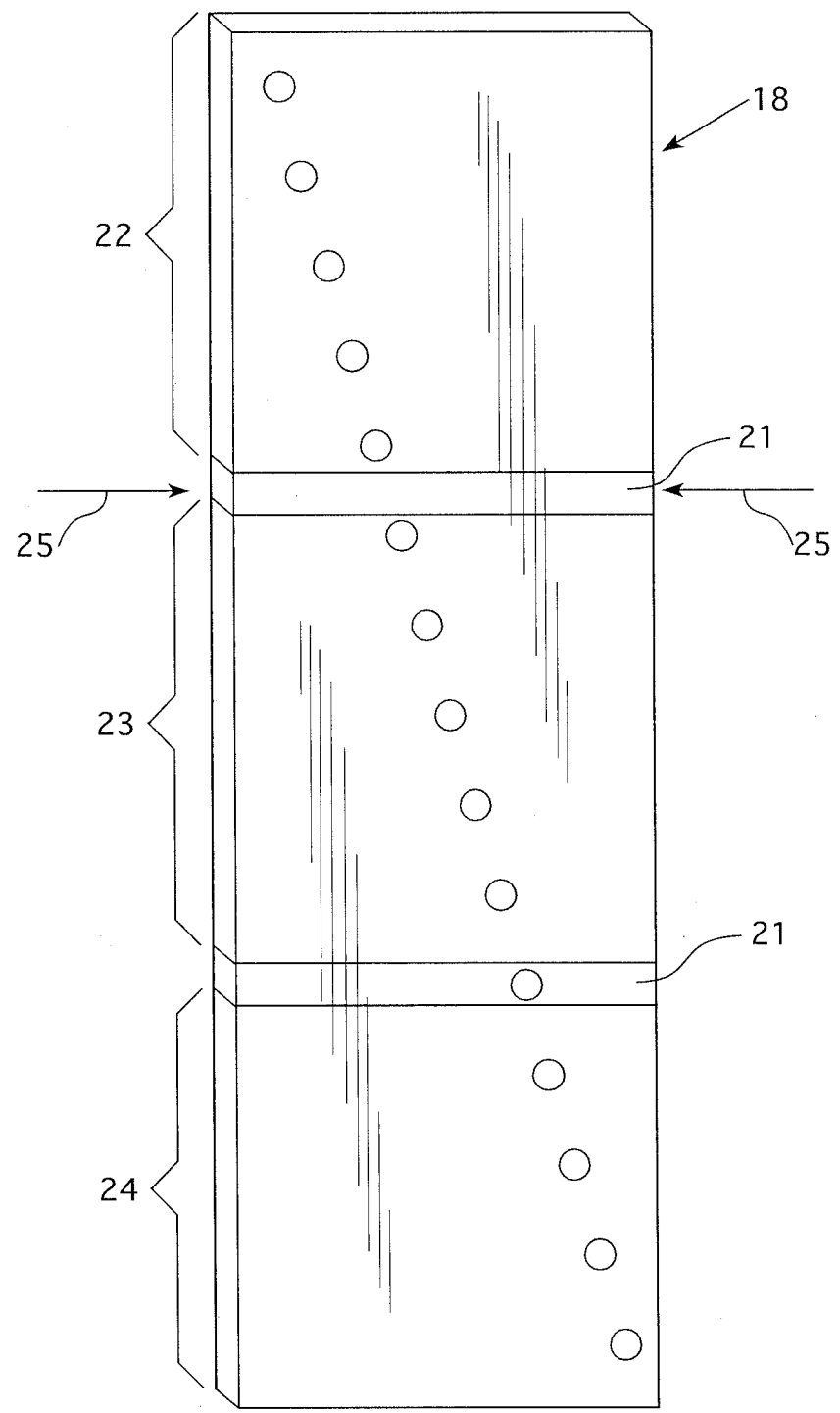
FIG. 2 is a perspective view of one panel of the control rod of FIG. 1.

Both physical and radiological criterion will dictate the optimal location along the length of a panel 18 at which lateral segmentation is desired. In other words, the configurations of the transport casks, the intended placement of a separated segment of a panel within the transport cask and the radiation intensity of the segment will all contribute to determine at what elevation along the panel 18 the lateral segmentation should be made. Once the desired point of lateral segmentation of the panel is determined, a preformed band of malleable metal will be slid along the length of the panel to that location or wrapped around the panel at that location. Two such bands 21 are shown in FIG. 2, however, it should be appreciated that the upper panel segment 22, middle panel segment 23 and lower panel segment 24 may or may not be of equal length and the number of panel segments and the number of bands employed will vary depending upon the foregoing dictates. As an example, the bands 21 may be formed from 303 stainless steel or copper and extend one to four inches (2.54-10.16 cm) on either side of the line of demarcation and be approximately ⅛ inch (0.32 cm) thick. Preferably, the bands 21 will extend between two and three inches (5.08-7.62 cm) on either side of the line of demarcation. The panel 18 with the band 21 positioned as described is crimped at the desired point of lateral segmentation and several inches to either side thereof to seal off both segments being separated at the point of demarcation. Lateral segmentation of both the crimped panel and band will be achieved by a hydraulic shear figuratively illustrated by reference character 25. The crimped band 21 is intended to limit or eliminate panel sheathing spring back, and to capture shattered sheathing and the neutron absorbing material within the tubes within the sheathing that has been embrittled by neutron exposure. Once sheared, the panel sections 22, 23 and 24 may be handled and packaged in a manner that optimizes physical and radiological efficiency.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of reducing the storage volume of a boiling water reactor control rod having a main control element with four panels radially extending along an elongated length of a central spline, at four ninety degree locations around a circumference of the spline, in a cruciform shape, comprising the steps of:

separating the spline along its elongated length into four substantially equal longitudinal sections with each longitudinal section including one of the panels;

identifying at least one elevation along a longitudinal length of each longitudinal section along which the longitudinal section is to be separated into lateral sections;

placing a sleeve laterally around the longitudinal section at the identified elevation, the sleeve extending an incremental distance on either side of the elevation; and laterally shearing at least one of the longitudinal sections at the elevation and substantially simultaneously sealing the sleeve against an opposite side of the sleeve as it is sheared.

2. The method of claim 1 wherein the incremental distance is substantially between one and four inches (2.54 and 10.16 cm).

3. The method of claim 2 wherein the incremental distance is more preferably between two and three inches (5.08 and 7.62 cm).

4. The method of claim 1 wherein the sleeve has a thickness of approximately one eighth of an inch (0.32 cm).

5. The method of claim 1 including the step of forming the sleeve from a malleable metal.

6. The method of claim 5 wherein the malleable metal is either stainless steel or copper.

7. The method of claim 1 wherein the step of separating the central spline is achieved by making two cuts along the elongated length and 180 degrees around the circumference of the spline with the two cuts being made substantially at the same time.

8. The method of claim 1 wherein the sealing step is achieved by crimping a sheared end of the sleeve to the opposite side of the sleeve.

9. The method of claim 8 wherein the crimping step and the shearing step occur substantially simultaneously.

10. The method of claim 1 wherein the placing step includes the step of wrapping the sleeve laterally around the longitudinal section at the identified elevation.

\* \* \* \* \*